3,332,903
RUBBER ADHESIVE FOR APPLICATION FROM SPRAY BOMB
John J. Kavalir, Two Mountains, Quebec, Canada, assignor to Uniroyal Inc., a corporation of New Jersey
No Drawing. Filed Apr. 27, 1962, Ser. No. 190,773
7 Claims. (Cl. 260—32.8)

This invention relates to a rubber cement, and more particularly it relates to a rubber cement or adhesive for aerosol application.

The dispensing of materials by the aerosol technique represents a highly convenient and advantageous method of applying substances. In the present context, by an aerosol technique I means the dispensing of material, from a valve-controlled nozzle of a spray can, bomb, or like, in which the material is contained under pressure in a condensed liquid propellant medium which is normally gaseous at atmospheric pressure. I refer to the composition including the propellant as an aerosol, regardless of whether the particle size of the dispensed material is less than about 35 microns (which is sometimes stated as a requirement for use of the term "aerosol"), or more than 35 microns. Unfortunately, in the case of rubber cement compositions the aerosol technique has not been applicable in a satisfactory manner as a practical matter, prior to the present invention, insofar as I am advised. Accordingly, a principal object of the present invention is to provide an improved aerosol rubber adhesive composition.

The invention is based upon the surprising and unexpected discovery that a highly effective aerosol rubber cement composition can be realized based on a dispersion or suspension of finely divided solid particles of a rubbery polymer in a normally liquid volatile organic medium in which the said rubber particles are insoluble.

In one aspect, the invention contemplates the use of acetone as the organic liquid in which the solid rubber particles are dispersed. As indicated the organic medium in which the finely divided rubbery substance is dispersed or suspended is a liquid at ordinary temperatures and pressures, and is essentially a non-solvent for the rubber employed. Certain solvents or combinations of solvents employed may swell the rubber particles, but they must not actually dissolve the rubbery material, since it is essential for purposes of the invention that the rubber remain in the form of discrete particles, as distinguished from dissolve drubber. For this reason the organic liquid medium in which the rubber particles are suspended may not be a solvent for the ruber. However, limited amounts of solvents may be present along with non-solvents for the rubber, in such proportions that the rubber does not dissolve. It will be understood that certain organic liquids which are solvents for rubber may become non-solvents when mixed with a quantity of another liquid. As far as solvating characteristics are concerned, the suitability of a given organic liquid (or combination of liquids) for use in the invention may be determined by subjecting the elastomer (as employed in its finely divided state) to agitation in the liquid in question for a period of 20 minutes. If the particles dissolve, the liquid is unsatisfactory. It may be mentioned that the organic liquids employed will almost invariably have boiling points within the range of about 23° C. to about 140° C. and in any particular case the solvent or combination of solvents selected will depend upon such factors as the nature of the particular rubber employed, the type of use to which the adhesive is to be put (particularly as to whether an extremely quick drying time is required, in which case the more highly volatile solvents will be emphasized, or whether a longer working time is desired in which the less volatile solvents will be included), and other factors. Viscosity requirements will also play an important part in the selection of the solvent or combination of solvents appropriate for a given case, as will be appreciated by those skilled in the art of compounding rubber cements. A preferred aspect of the invention is directed to the use, as the volatile organic liquid suspending medium for the rubber particles, of acetone, or toluene, or mixtures of acetone and toluene with each other or with other solvents such as those of the type represented by methylene dichloride, trichloroethylene, xylol, naphtha, n-heptane, trichloromonofluoromethane and the like. Other solvents that may be named include hexane, cyclohexane, methyl ethyl ketone, methyl isobutyl ketone, benzene, ethyl acetate, butyl acetate, xylene, ethylene dichloride, chlorobenzene, perchloroethylene, n-octane and the like. With respect to the selection of the elastomer, acetone, naphtha, hexane, ethyl acetate, and butyl acetate may be mentioned in conjunction with use of butadiene-acrylonitrile rubber; butyl acetate, naphtha, xylene or toluol may be used in conjunction with polychloroprene rubber; and acetone is suitable with SBR. The practice of the invention may contemplate the use of from about 70 to about 1000 parts by weight of organic liquid carrier, and preferably from about 150 to about 600 parts, per 100 parts of the polymers present (i.e. elastomer, resin, liquid polymer), but these values are not critical.

The invention has particular reference to the use, as the finely divided rubber solid, of a rubbery polymer of the type represented by polychloroprene, butadiene-acrylonitrile copolymer rubber (containing, for example, 15% to 45% of acrylonitrile), and butadiene-styrene copolymer rubber (containing, for example, 15% to 45% of styrene). In one aspect the invention contemplates the use of butadiene-acrylonitrile of the so-called cross-linked or high gel type, made for example by including a cross-linking monomer such as divinyl-benzene in the copolymerization, or made by carrying the copolymerization to high conversion; such butadiene-acrylonitrile rubber is sometimes called an insoluble type, since it is essentially insoluble in ordinary solvents for the uncured rubber. For purposes of the invention the rubber must be, as indicated, in the form of finely divided particles, that is it must be used as a powder. It may be mentioned that particle sizes of 300 microns smaller, e.g. 50 or 100 microns down to for example about 2 or 3 microns (these may be either ultimate particle sizes or the effective sizes of agglommerates of smaller particles) are suitable depending on the specific formulation and intended use of the product. These elastomers are of course suitably employed in their raw (uncured) or virgin state, as distinguished from reclaim rubber for example.

One aspect of the invention involves the additional inclusion in the cement of one or more resinous substances intended to provide particular properties and combinations of properties in a given case. Thus, resinous materials may be used for such purposes as to control tack, penetration and special adhesion to specific surfaces and to act as plasticizers, or for combinations of these purposes. Among the more important such resins may be mentioned of the types represented by phenolic resins, rosin resins (and equivalent various similar natural or modified gums), coumarone-indene resin, resinous coal tar residue (and equivalent pitches, polymerized hydrocarbon petroleum residues, and the like), amine resins (e.g. melamine-formaldehyde resin), polyamide resins polybetapinene, epoxy resins and alkyd resins. In the category of phenolic resins I contemplate not only straight phenol-formaldehyde resin itself but also equivalent resins made in the well known manner by condensing phenols or substituted phenols [e.g. paratertiarybutylphenol or other alkyl phenols, cresols, etc.] or polyphenols [e.g. resorcinol] with formaldehyde or other aldehydes [where such resins are of the resol types, "A-stage" resins, novolac types, or the like] with or without modification by oils or other substances, as well as equivalent resins made by reacting phenols with terpenes (e.g. turpentine, dipentene, with or without reaction with aldehydes) or other materials. Numerous such resins are commercially available as exemplified by the resol phenolic resins such as "Super Beckacite 1001" (condensation product of paratertiary-butylphenol and formaldehyde), "Amberol ST-137" (condensation product of paraoctylphenol and formaldehyde); the novolac resins "Durez 12687" (cashew nut shell oil modified phenol-formaldehyde resin prepared as described for example in Shepard et al. U.S. Patent 2,203,206); "Durez 12603" (thermoplastic terpene modified phenol-formaldehyde resin having a capillary tube melting point of 270°); "Durez 2401" (terpene-modified phenol-formaldehyde resin having a capillary tube melting point of about 335° F.); straight A-stage phenol-formaldehyde resins such as "Durez 12704"; "Shanco 700" (terpene phenolic resin); "Schenectady Varnish SP553" (terpene phenolic resin); and various other modified or straight phenol-formaldehyde resins such as "Durez 12687," "G. E. Resins 12316 and 12393," "Schenectady Varnish SP-8014 and SP-12, "Catalyn 8732," "Bakelites" TBR-14634, BKR-2620, CKRA-1977 and TR-14634, and "Poly-Phen-S105". Among the rosin-type resins may be mentioned natural wood rosin ("F. F. Rosin"), pine wood rosin (Vinsol"), rosin salts ("Zitro," "Zinar," "Zinrex," zinc resinates), heat treated wood rosin ("Solros"), hydrogenated rosin-type products ("Galex," di-, tri- and tetrahydroabietic acids), rosin esters ("Pentalyn A," pentaerythritol ester of rosin; "Pentalyn H," pentaerythritol ester of hydrogenated rosin; "Pentalyn M" pentaerythritol abietate resin); "Staybelite Ester No. 10," glycero-ester of hydrogenated rosin; "Polypale Ester 10," glycerol ester of polymerized rosin; "Herculyn" [primarily dihydromethyl abietate]); and substantially petroleum hydrocarbon-insoluble pine wood rosin (prepared, for example, in accordance with the processes of U.S. patents to Hall Nos. 2,193,026 and 2,221,540). "Picolyte S-85" and "Picolyte S-105" are examples of commercial polybetapinene. The epoxy resins that may be used include reaction products of such polyhydric alcohols as resorcinol or bisphenols with such polyfunctional halohydrins as epichlorohydrin and glycerol di-chlorohydrin (a typical such resin is the "Epon 815" resin as shown in U.S. Patent 2,707,708 to Wittcoff, column 4, lines 2–5). Alkyd resins include such products as "Resyl X-315" or "Paraplex G-60", poly (ethylene glycol sebacate), Industrial and Engineering Chemistry, vol. 37, page 504 (1945). As indicated previously, it may be desirable to employ more than one such resinous substance in particular cases to achieve a desired effect or combination of effects such as tack, specific adhesion, and/or plasticity. These materials are dissolved in the organic liquid medium described above. In accordance with a preferred practice, the amount of resin frequently ranges from about 10% to about 90% by weight, preferably about 40% to about 70% by weight, of the combined weight of the elastomer and resin, but these values may be varied.

The invention also contemplates the use of, in addition to resins as described above (or, less preferably, in some cases in lieu of the described resins), a different liquid polymer (which I refer to as a "liquid elastomer" because it is usually a butadiene polymer or copolymer and can be vulcanized) such as liquid butadiene-acrylonitrile copolymers or the like (see for example U.S. patent 2,731,185, Schulze). Such products are particularly useful as plasticizers in the present adhesive. Like the resin, such liquid polymer, if used, frequently ranges from about 10% to about 90% by weight, preferably about 40% to about 70% by weight, of the combined weight of the elastomer and the liquid polymer. The liquid polymer (liquid elastomer) is, like the resin, dissolved in the organic liquid medium. Various other plasticizers can be used.

The cement composition may further include any suitable secondary compounding ingredients, such as pigments, dyes, curing agents if desired, and the like. Titanium dioxide is one example of a suitable pigment. Zinc oxide powder serves not only as a pigment but it has the further advantage of acting as an acid acceptor to prevent deterioration of fabric on which the cement is used. Curing agents such as sulfur may be present, but any accelerator which would render the composition unstable in the can should not be mixed in with the rubber-containing adhesive. If desired, such accelerator may be applied separately in accordance with the well-known two part cement technique.

In one mode of practicing the invention I may prepare a "concentrate" comprising suspended rubber particles, organic liquid medium, dissolved resin(s), and other desired ingredients. This concentrate may in itself be a relatively high-solids, highly viscous material that would not in itself be adaptable to rapid charging into spray cans. However, it may be convenient for the rubber cement compounder to market the composition in this concentrated form to the can-filling operator, who dilutes or reduces the concentrate with an organic liquid (or mixture of liquids) having the solvent characteristics stated previously to provide a more fluid composition which is easily filled rapidly into pressure cans or bombs along with the propellent. The diluent liquid may be the same as or different from the liquid used to prepare the concentrate.

The propellent may be any suitable conventional propellant conventionally used in spray can or aerosol applications and may be described as a material that is normally gaseous at ordinary temperatures and pressures, but is condensable to a liquid under the pressure existing within the can. The propellent is compatible with the organic liquid medium in which the rubber is suspended. The suspension of rubber in the liquid medium comprising propellent and organic solvent need not be a permanent or stable suspension, since it is merely necessary to shake the bomb before using to distribute the rubber particles uniformly throughout the liquid medium.

In a modification of the invention, there may be added to the suspended rubber composition of the invention a small amount of a rubber cement containing the rubber in dissolved form. However, I find it advisable to limit the quantity of such added dissolved rubber cement to that amount which provides 5% of the total rubber present in dissolved form, as a maximum.

The particular materials selected for use in practicing the invention and their proportions will depend upon the particular characteristics or properties desired in the adhesive, as determined by the intended application of the adhesive, as will be understood by those skilled in the art of compounding adhesives. Speed of drying, degree of tack, presence or absence of dry tack, degree of penetration, viscosity, volatility, nature of the materials to be united, and other factors will dictate the optimum composition for any given case. In accordance with typical practice of the invention, it may be stated that compositions of the invention will almost invariably contain, in 100 parts by weight of the bomb load, from 0.25 to 23 parts of rubber powder (preferably from 4.7 to 3.8 parts), from 7.2 to 39 parts of resin(s) (preferably from 7.2 to 8.5 parts), from 9 to 69 parts of organic liquid medium including both solvents and diluents (preferably 49 to 57.5 parts), and from 10 to 90 parts (preferably 30 to 40 parts) of suitable propellant, but these values are not critical.

In the form of my invention which I refer to as the "concentrate," which is intended to be mixed with diluent and propellant in charging the bomb, there is usually present, in 100 parts by weight of concentrate, from 8 to 19 parts (preferably 9 to 10 parts) of rubber powder, from 2.5 to 10 parts (preferably 14 to 22 parts) of resin, and from 65 to 80 parts (preferably 70 to 78 parts) of volatile organic liquid medium.

The following examples, in which all quantities are expressed by weight, will serve to illustrate the practice of the invention in more detail.

*Example 1*

In this example the rubbery material used was butadiene-acrylonitrile copolymer rubber of high acrylonitrile content (e.g., about 40%), known as "Hycar 1411," described as a non-soluble powder. It contained 16–18% stearic acid which was believed to exist on the surface of the particles. In order to convert the stearic acid to a form which would not interfere with the adhesive qualities of the rubber, the rubber powder was treated with 2,4,6-tri(dimethylaminomethyl) phenol which reacted with the stearic acid and converted it to a wetting-agent type of substance which was not injurious to the adhesive. It will be understood that the step of treating with tri(dimethylaminomethyl) phenol can be omitted in the case of rubber powders not containing stearic acid. To carry out the treatment with tri(dimethylaminomethyl) phenol 1.5 parts of this substance is mixed with 500 parts of acetone and 100 parts of the butadiene-acrylonitrile rubber powder and stirred thoroughly. Separately, 200 parts of heat-reactive oil-soluble phenol formaldehyde resin (e.g. "Bakelite CR–634 or BR–14634"; "ST–137" resol resin, or similar resin as described above) is dissolved in 300 parts of acetone. The two solutions are then mixed together and passed through a screen having openings of 60 mesh size to remove any particles, lumps or agglomerates larger than this size. To make the composition thin enough to be filled into cans at reasonable speed 1101.5 parts of the described composition is mixed with 550 parts of trichloromonofluoromethane or other diluent such as methylene dichloride. 70 parts of the resulting mixture is then charged into spray cans along with 30 parts of dichlorodifluoromethane as a propellant. The composition makes an excellent wet stick adhesive for paper and the like, that is, when a minute amount is sprayed from the valve-controlled nozzle (e.g., 0.016 inch mechanical break up reverse taper nozzle) of the can onto a piece of paper, and such paper is contacted quickly with another piece of paper the two pieces instantly stick together so firmly that the paper will tear before the bond will break.

*Example 2*

In this example three different adhesive compositions were made up based on powdered polychloroprene rubber. The polychloroprene rubber used ("Neoprene PB") contained 40 parts of clay in 100 parts of polychloroprene. The material passed through a 300 mesh (25 micron) screen. The formulations were as follows:

| Ingredients | Mix, Parts by Weight | | |
|---|---|---|---|
| | 2A | 2B | 2C |
| "Neoprene PB" powder | 100 | 100 | 100 |
| Hydrogenated rosin glyceride ester (e.g., "Staybelite Ester 10") | 50 | 50 | |
| Terpene-phenolic resin ("Shanco 700"; e.g., Honel et al., U.S. patent 2,123,808, Example I) | 50 | 50 | 50 |
| Phenol-formaldehyde resin (oil-soluble, heat-reactive type, e.g., "SP533", "ST–137" or other such resins described above) | | | 50 |
| Acetone | 500 | 500 | |
| Toluene | | | 500 |
| Trichloromonofluoromethane ("G–11"), diluent | | | 350 |
| Methylene dichloride, diluent | 235 | 350 | |
| Dichlorodifluoromethane ("G–12"), propellant | 620 | 705 | 705 |
| Total solids of cement containing diluent, without propellant | 21.50 | 19.10 | 19.10 |
| Total solids of cement without diluent or propellant | 28.60 | 28.60 | 28.60 |
| Total solids of charge in bomb (i.e., cement with diluent and propellant) | 12.85 | 11.40 | 11.40 |
| Percentage composition of material in bomb percent cement (i.e., concentrate less diluent and propellant) | 45.0 | 40.0 | 40.0 |
| Percent Diluent | 15.0 | 20.0 | 20.0 |
| Percent Propellant | 40.0 | 40.0 | 40.0 |

In a typical procedure for making these compositions the resin(s) may be dissolved in 80 parts of the solvent. The remaining solvent may be placed in a container, to which the powdered polychloroprene rubber is added, then stirred for five minutes. The resin solution may then be added to the polychloroprene suspension and stirred for five minutes or until the suspension is homogeneous. This suspension may be regarded as the "cement" or "concentrate." This material may be shipped to the aerosol bomb producer. The bomb filler adds the diluent to the concentrate and places the required amount of the mixture in the bomb. He then adds the propellant. In the formulations of this example the hydrogenated rosin ester and the phenolic resin may be regarded as tackifying resins; the terpene-phenolic resin is used to obtain special adhesion to specific surfaces. The formulation 2A had good sprayability, and the "open time" (i.e., the period of time after spraying within which the surfaces to be united would stick when brought together) was from 5 to 15 seconds, making this composition excellent for use as what is sometimes termed in the trade a "quick grab" adhesive. Composition 2B sprayed as well as 2A, and was perfect for uniting kraft paper to kraft paper. The composition could be sprayed through all kinds of different nozzles. The optimum distance was 6 to 10 inches from the surface to be sprayed. Composition 2C was perfect for a general purpose adhesive where no dry tack is required.

From the foregoing examples it will be apparent that the invention possesses many surprising advantages. The capability of being dispensed from an aerosol bomb with ease and efficiency as described represents a unique characteristic of the present rubber adhesive composition. Compounded as described, the resulting adhesive film is neither too dry (i.e., tack life is not too short) nor does it remain permanently excessively tacky, nor is the degree of penetration excessive. When the present adhesive passes through the spray nozzle of the aerosol bomb it does not become stringy or webbed, and therefore it is possible to deposit a desirable continuous film of adhesive on the surface to be united. The invention avoids the serious fault of stringing or webbing and therefore the present adhesive performs in the same way as one which is brushed or sprayed with a gun by conventional methods. Uniform results are readily obtained.

It was indeed surprising to find that the present adhesive containing rubber in the form of a finely divided powder could be aerosol sprayed perfectly. An important advantage is that this adhesive is stable in the can and does not tend to agglomerate with age, or result in webbing when aerosol sprayed after storage.

The adhesive can be filled into cans quickly, an important consideration in commercial practice.

It is amazing that the rubber powder in the present composition, on shaking, floats freely throughout the solution, but yet, when the solvent is evaporated, a good, "leggy" adhesive is produced. Even after long periods of storage the rubber powder is redispersed easily on shaking.

While it is not desired to limit the invention to any particular theory of operation, it is believed that some light may be thrown on the manner in which the invention operates by considering in some detail what happens when solvent evaporates from substantially dissolved elastomer. It is well known in the adhesive trade that uncured elastomers can swell and dissolve in suitable solvents. This dissolved elastomer releases solvent very slowly. If there is a great and rapid change in vapor pressure, the solvent tries to escape so quickly that bubbling or foaming occurs. In an aerosol bomb, the solvent adhesive is homogeneously mixed with the propellant, which is a liquid under a pressure of 50 to 70 pounds per square inch. When the valve is opened, the pressure is released and the contents of the bomb are ejected through a nozzle because of the difference in pressure with the atmosphere. The nozzle is so constructed that the contained liquid is sprayed out in tiny droplets.

When the bomb contains a resin or non-elastomeric material, these droplets lose solvent exceedingly rapidly so that the solid particles which come out of solution do not increase in volume, nor agglomerate, so that they reach the surface on which they are sprayed in the form of a fine mist.

When a dissolved elastomer is used the above does not occur, the solution passes through the nozzle and then the solvent tries to volatilize. In so doing it causes a tremendous increase in particle volume and these particles pin together in either a web or a streamlike spray.

This webbing or foaming continues on the sprayed surface until all of the solvent has escaped.

In addition there is the effect of cooling by evaporation so that drying of the solvent trapped in the elastomer is delayed even more. This allows the adhesive to remain wet and induces deeper penetration of porous surfaces or actual run-off, if the spray is on a non-absorbent material.

In contrast to the foregoing, when using a finely dispersed solid elastomer which is not dissolved by the solvents or the liquified propellant gas in accordance with the invention, apparently no explosive increase in volume of the sprayed solid elastomer occurs; nor is the cooling effect great enough to prevent the sprayed film from drying rapidly, so preventing excessive penetration of run-off.

The elastomer particles are laid down as an adhesive mist with particles of resin dispersed throughout the film of elastomer.

The foregoing consideration may be at least in part an explanation for the unexpected success of the present adhesive when sprayed as an aerosol.

It may be mentioned that by suitable adjustment of the formulation the adhesive may be made suitable for many applications, such as shoe repairs to sock lining in shoe stores, general fast repair cement for garages (weather-stripping, seat covers, etc.), cements for packaging, household use, cements for floor coverings, for insulation (polystyrene board, paper aluminum, rock wool, etc.) and for furniture manufacture (rubber foam to itself and to wood or metal).

The adhesive of the invention is unlike certain rug backing aerosol sprays intended to produce a non-slipping coating on a rug. Such material based on about 25% dissolved rubber and 75% insoluble rubber and containing no resin does not provide the advantages of the present adhesive composition.

Having thus described my invention, what I claim and desire to protect by Letters Patent is:

1. An adhesive composition comprising a rubbery polymer, selected from the group consisting of polychloroprene rubber, butadiene-acrylonitrile copolymer rubber and butadiene-styrene copolymer rubber, in the form of finely divided particles having an effective particle size of from 2 to 300 microns, a volatile organic liquid suspending medium for said particles, the particles being insoluble in the said medium, and a tackifying resin dissolved in the said organic liquid medium, the composition containing from 70 to 1000 parts of said organic liquid medium, per 100 parts of said rubbery polymer plus resin, and the amount of resin being from 10% to 90% of the combined weight of rubbery polymer plus resin, the said proportions being by weight.

2. An aerosol bomb charged with an aerosol spray adhesive composition comprising a rubbery polymer, selected from the group consisting of polychloroprene rubber, butadiene-acrylonitrile copolymer rubber and butadiene-styrene copolymer rubber, in the form of finely divided particles having an effective particle size of from 2 to 300 microns, a volatile organic liquid suspending medium for said particles having a boiling point of from 23° C. to 140° C., the particles being insoluble in the said medium, tackifying resin dissolved in the said organic liquid medium, and a propellant for the previously mentioned ingredients, said propellant being compatible with the said organic liquid medium and being present as a liquid which is normally gaseous at standard temperatures and pressures, the composition containing, in 100 parts, from 0.25 to 23 parts of said rubbery polymer, from 7.2 to 39 parts of said resin, from 9 to 69 parts of said organic liquid medium, and from 10 to 90 parts of said propellant, the said parts being by weight.

3. An aerosol spray adhesive composition comprising a rubbery polymer entirely in the form of finely divided particles having an effective particle size of from 2 to 300 microns selected from the group consisting of polychloroprene rubber, butadiene-acrylonitrile copolymer rubber and butadiene-styrene copolymer rubber, a volatile organic liquid suspending medium for said particles, the particles being insoluble in the said medium, a tackifying resin dissolved in the said organic liquid and a propellant for said particles and organic liquid, said propellant being compatible with the said organic liquid medium and being present as a liquid which is normally gaseous at standard temperatures and pressures, the composition containing, in 100 parts, from 0.25 to 23 parts of said rubbery polymer, from 7.2 to 39 parts of said resin, from 9 to 69 parts of said organic liquid medium, and from 10 to 90 parts of said propellant, the said parts being by weight.

4. An aerosol spray adhesive composition comprising a rubbery polymer, selected from the group consisting of polychloroprene rubber, butadiene-acrylonitrile copolymer rubber and butadiene-styrene copolymer rubber, in the form of finely divided particles having an effective particle size of from 2 to 300 microns, an organic liquid suspending medium for said particles comprising acetone, the particles being insoluble in said acetone, a tackifying resin dissolved in the said organic liquid and a propellant for said previously mentioned ingredients, said propellant being compatible with the said organic liquid medium and being present as a liquid which is normally gaseous at standard temperatures and pressures, the composition containing, in 100 parts, from 0.25 to 23 parts of said rubbery polymer, from 7.2 to 39 parts of said resin, from 9 to 69 parts of said organic liquid medium, and from 10 to 90 parts of said propellant, the said parts being by weight.

5. An aerosol spray adhesive composition comprising a rubbery polymer, selected from the group consisting of polychloroprene rubber, butadiene-acrylonitrile copolymer rubber and butadiene-styrene copolymer rubber, in the form of finely divided particles having an effective particle size of from 2 to 300 microns, a volatile organic liquid suspending medium for said particles, the particles being insoluble in the said medium, a tackifying resin dissolved in the said organic liquid medium, a liquid butadiene-acrylonitrile copolymer dissolved in the said organic liquid medium, and a propellant for the previously mentioned ingredients, said propellant being compatible with the said organic liquid medium and being present as a liquid which is normally gaseous at standard temperatures and pressures, the composition containing, in 100 parts, from 0.25 to 23 parts of said rubbery polymer, from 7.2 to 39 parts of said resin, from 9 to 69 parts of said organic liquid medium and from 10 to 90 parts of said propellant, the said parts being by weight, and the amount of said liquid butadiene-acrylonitrile polymer being from 10% to 90% by weight of the combined weight of the said rubbery polymer and said liquid polymer.

6. An aerosol spray adhesive composition comprising a rubbery polymer, selected from the group consisting of polychloroprene rubber, butadiene-acrylonitrile copolymer rubber and butadiene-styrene copolymer rubber, in the form of finely divided particles having an effective particle size of from 2 to 300 microns, a volatile organic liquid suspending medium for said particles having a boiling point of from 23° C. to 140° C., the particles being insoluble in said medium, a tackifying resin dissolved in said organic liquid, and dichlorodifluoromethane as a propellant, the composition containing, in 100 parts, from 0.25 to 23 parts of said rubbery polymer, from 7.2 to 39 parts of said resin, from 9 to 69 parts of said organic liquid medium, and from 10 to 90 parts of said propellant, the said parts being by weight.

7. An aerosol spray adhesive composition comprising a rubbery polymer in the form of finely divided particles having an effective particle size of from 2 to 300 microns selected from the group consisting of polychloroprene rubber, butadiene-acrylonitrile copolymer rubber and butadiene-styrene copolymer rubber, a volatile organic liquid suspending medium for the said particles comprising at least one organic solvent in which the particles are insoluble having a boiling point of from 23° C. to 140° C., at least one tackifying resin dissolved in said solvent, and a propellant for the said ingredients, said propellant being compatible with the said organic liquid medium and being present as a liquid which is normally gaseous at standard temperatures and pressures, the composition containing, in 100 parts, from 0.25 to 23 parts of said rubbery polymer, from 7.2 to 39 parts of said resin, from 9 to 69 parts of said organic liquid medium, and from 10 to 90 parts of said propellant, the said parts being by weight.

References Cited

UNITED STATES PATENTS

| | | | |
|---|---|---|---|
| 2,875,184 | 2/1959 | Tann | 260—33.6 |
| 2,884,400 | 4/1959 | Moore | 260—33.6 |
| 2,918,442 | 12/1959 | Gerrard et al. | 260—33.6 |
| 3,086,951 | 4/1963 | Wile | 260—33.6 |
| 3,144,428 | 8/1964 | Kost | 260—32.8 |
| 3,145,189 | 8/1964 | Fourier | 260—32.8 |
| 3,179,617 | 4/1965 | Moore | 260—33.8 |

FOREIGN PATENTS

| | | |
|---|---|---|
| 877,035 | 9/1961 | Great Britain. |

MORRIS LIEBMAN, *Primary Examiner.*

ALEXANDER H. BRODMERKEL, ALLAN LIEBERMAN, *Examiners.*

J. W. BEHRINGER, *Assistant Examiner.*